(12) United States Patent
Lee

(10) Patent No.: US 9,258,615 B2
(45) Date of Patent: Feb. 9, 2016

(54) METHOD FOR PROVIDING INTERACTIVE CONTENTS FOR SMART TV

(71) Applicant: CREFUN CO., LTD., Jeollanam-do (KR)

(72) Inventor: Kil Chan Lee, Jeollanam-do (KR)

(73) Assignee: CREFUN CO., LTD., Jeollanam-do (KR)

( * ) Notice: Subject to any disclaimer, the term of this patent is extended or adjusted under 35 U.S.C. 154(b) by 0 days.

(21) Appl. No.: 14/399,067

(22) PCT Filed: Mar. 7, 2014

(86) PCT No.: PCT/KR2014/001878
§ 371 (c)(1),
(2) Date: Nov. 5, 2014

(87) PCT Pub. No.: WO2014/137181
PCT Pub. Date: Sep. 12, 2014

(65) Prior Publication Data
US 2015/0143389 A1 May 21, 2015

(30) Foreign Application Priority Data

Mar. 7, 2013 (KR) ........................ 10-2013-0024230

(51) Int. Cl.
| | |
|---|---|
| *H04N 7/16* | (2011.01) |
| *H04N 21/478* | (2011.01) |
| *G06Q 30/06* | (2012.01) |
| *G06Q 20/12* | (2012.01) |
| *G06Q 20/40* | (2012.01) |
| *G06T 11/60* | (2006.01) |
| *G11B 27/022* | (2006.01) |

(Continued)

(52) U.S. Cl.
CPC ......... *H04N 21/47815* (2013.01); *G06Q 20/12* (2013.01); *G06Q 20/4014* (2013.01); *G06Q 30/0601* (2013.01); *G06Q 30/0641* (2013.01); *G06T 11/60* (2013.01); *G11B 27/022* (2013.01); *H04N 5/76* (2013.01); *H04N 5/772* (2013.01); *H04N 21/2542* (2013.01); *H04N 21/2543* (2013.01); *H04N 21/274* (2013.01); *H04N 21/4622* (2013.01); *H04N 21/8173* (2013.01)

(58) Field of Classification Search
CPC ............ H04N 21/2542; H04N 21/274; H04N 21/47815
See application file for complete search history.

(56) References Cited

U.S. PATENT DOCUMENTS

| | | | | |
|---|---|---|---|---|
| 2010/0017816 A1* | 1/2010 | Martini et al. | ................... | 725/31 |
| 2010/0235256 A1* | 9/2010 | Kang | ............................... | 705/27 |
| 2011/0131296 A1* | 6/2011 | Lee et al. | ...................... | 709/219 |
| 2011/0202424 A1* | 8/2011 | Chun et al. | ................... | 705/26.8 |

FOREIGN PATENT DOCUMENTS

| | | | |
|---|---|---|---|
| KR | 10-2006-0022766 A | | 3/2006 |
| KR | 10-2007-0043095 A | | 4/2007 |

(Continued)

OTHER PUBLICATIONS http://www.web.archive.org/web/20130121133955/https://www.netsko.com/tv_help (Jan. 21, 2013).

*Primary Examiner* — Gigi L Dubasky
(74) *Attorney, Agent, or Firm* — Rabin & Berdo, P.C.

(57) ABSTRACT

The present invention relates to a method for providing interactive contents for a smart TV, which allows a seller to directly upload contents such that vivid contents can be easily provided.

6 Claims, 13 Drawing Sheets

(51) Int. Cl.
*H04N 21/254* (2011.01)
*H04N 21/2543* (2011.01)
*H04N 21/274* (2011.01)
*H04N 21/462* (2011.01)
*H04N 21/81* (2011.01)
*H04N 5/77* (2006.01)
*H04N 5/76* (2006.01)

(56) References Cited

FOREIGN PATENT DOCUMENTS

KR 10-0708418 B1 4/2007
KR 10-2010-0079683 A 7/2010

\* cited by examiner

Welcome

1. Viewer Category (1) Movie/Entertainment (2) TV Series (3) Community

2. Shopping Category (1) Clothes (2) Food (3) Golf (4) Home Appliances (5) Travel 3. Live Broadcasting Category 4. Broadcasting Standby Category

FIG. 4

Food (1)  (2)  (3)

(4)  (5)  (6)

| Previous Screen | Purchase | Cancel | Start-up Screen |

ON AIR (1)

(2)

(3)

(4)

(5)

(6)

| Previous Screen | Purchase | Cancel | Start-up Screen |

Broadcating Standby (1)

(2)

(3)

(4)

(5)

(6)

| Previous Screen | Purchase | Cancel | Start-up Screen |

Food

1. Food Name
2. Production Date
3. Price
4. Expiration Date
5. Storage Method

| Previous Screen | Purchase | Cancel | Start-up Screen |

Food

Credit Card Number :

Deposit Without Banknote :

Mobile Phone Payment :

(1) Seller Name :

(2) Product Name :

(3) Feature :

(4) Price :

(5) Others :

| Uploade | Preview | Live Broadcasting |

FIG. 14

METHOD FOR PROVIDING INTERACTIVE CONTENTS FOR SMART TV

TECHNICAL FIELD

The present invention relates to a method for providing interactive contents for a smart TV, and more particularly, to a method for providing interactive contents for a smart TV, which enables a seller to directly upload contents such that the seller can easily provide contents and conveniently provide vivid contents.

BACKGROUND

In general, a smart TV refers to a TV through which a user can watch moving images without disconnection of data while hanging among three screens of a mobile phone, a PC, and the TV. Such a smart TV may download contents through the Internet in real time, and serve as a communication center through which news, weather, emails and the like can be directly checked.

Recently, a lot of electronic commerce-related technologies for providing a home shopping program or the like using such a smart TV have been proposed.

In such conventional technologies, however, a product seller delivers product-related contents to a person in charge for a home shopping company, and the person in charge uploads the contents. Thus, it is inconvenient for the seller to provide the contents.

Furthermore, since it is inconvenient to provide contents as described above, the contents may not be quickly updated. In this case, there are difficulties in providing vivid contents.

Furthermore, since the e-commerce technology using a smart TV is publicly known, the detailed descriptions thereof are omitted herein.

DISCLOSURE

Technical Problem

An embodiment of the present invention is directed to a method for providing interactive contents for a smart TV, which allows a seller to directly provide contents such that vivid contents can be easily provided.

Technical Solution

In an embodiment, there is provided a method for providing interactive contents for a smart TV, which includes a server configured to store viewer contents and seller contents provided by a seller, a smart TV used by a user and having a user application mounted therein so as to display contents, and a smart device for a seller having a seller application mounted therein so as to upload contents to the server, and provides contents to the user through the smart TV. The user application may include an image reproduction module configured to reproduce the contents stored in the server on the smart TV, a purchase module for payment when a product is purchased, and a communication module configured to communicate with the server. The seller application may include an image transmission module through which the seller uploads contents to the server, an image editing module for editing a related image, and a sale module configured to transmit and receive sale-related information. The seller may directly upload contents, and the user may then select the contents.

The image reproduction module may include: step for displaying a start-up screen on the smart TV watched by the user; step for displaying a screen corresponding to a category selected by the user; and step for driving the purchase module for product payment when the user purchases a product, and step for displaying the start-up screen when no instruction is made after waiting for an instruction of the user for a predetermined time in case where the user does not purchase a product.

The start-up screen may display a viewer category, a shopping category, a live broadcasting category, and a broadcasting standby category, and then display the category selected by the user.

When the user selects the live broadcasting category, the contents provided by the seller may be displayed in real time. When the user selects the broadcasting standby category, a broadcasting standby screen on which the seller is waiting for broadcasting may be displayed, and when the seller uploads related contents, the contents may be displayed in real time.

The purchase module may include: step for checking personal information inputted by the user; step for checking payment information inputted for product payment; step for approving the product sale when the input payment information is correct or rejecting the product sale when the input payment information is not correct; and step for providing information to the seller when the product purchase is approved.

In the step for displaying of the start-up screen on the smart TV watched by the user, contents provided by the seller and related to products may be classified and displayed for each category. In the step for displaying of the screen corresponding to the category selected by the user, a plurality of contents corresponding to the selected category may be displayed on the screen. When the user selects specific contents of the contents, the specific contents may be expanded and displayed, and product information related to the specific contents may be displayed at one side of the screen.

The image transmission module may include: step for displaying a category of contents to be uploaded; step for displaying a screen corresponding to the category selected by the seller; step for displaying a button for selecting and uploading a contents file to be transmitted by the seller, a preview button, and a window for inputting product information on the screen; and step for allowing the seller to upload contents.

The image transmission module may further include step for allowing the seller to log in, before or after the step for displaying of the category of the contents to be uploaded.

The image transmission module may further include step for checking or correcting the contents after the step for allowing of the seller to upload the contents.

The features and advantages of the present invention will be apparent from the following detailed descriptions based on the accompanying drawings.

The terms or words used in the present specification and claims must not be analyzed as typical and dictionary definitions, and must be analyzed as definitions and concepts coinciding with the technical idea of the present invention, based on the principle that the present inventor can properly define the concepts of the terms to describe the present invention in the best way.

Advantageous Effects

According to the present invention, the method for providing interactive contents for a smart TV may allow a seller to easily provide contents such that vivid contents can be provided.

BRIEF DESCRIPTION OF THE DRAWINGS

FIGS. 4 to 10 are conceptual views illustrating an example of the user application according to the embodiment of the present invention.

FIGS. 12 to 14 are conceptual views illustrating an example of the seller application according to the embodiment of the present invention.

BEST MODE FOR THE INVENTION

Figure 1:
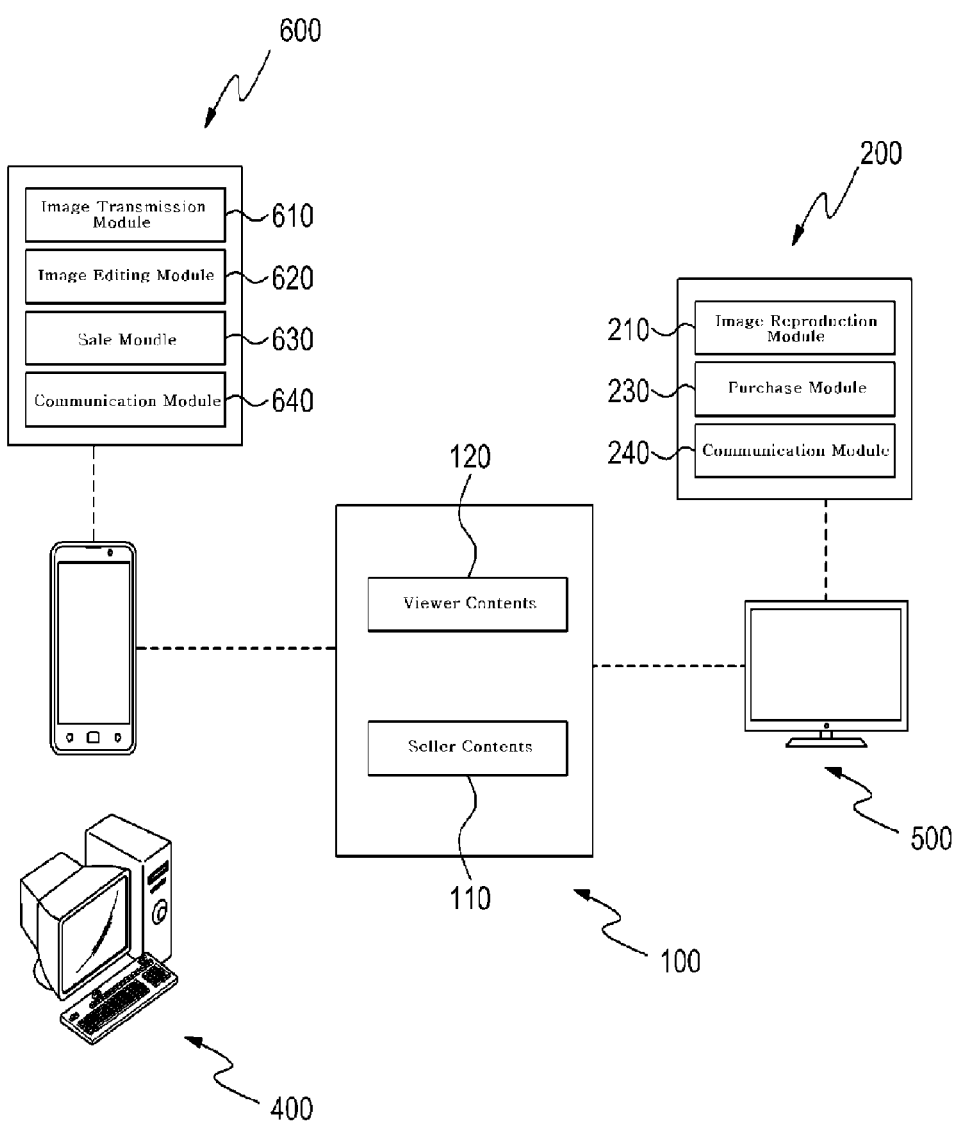
FIG. 1 is a conceptual view of a method for providing interactive contents for a smart TV according to an embodiment of the present invention.

The objective, specific advantages, and novel features of the present invention will be apparent from the following detailed descriptions and preferred embodiments with reference to the accompanying drawings. When reference numerals are attached to components of each drawing in the present specification, like components have the same reference numeral even though the components are shown on different drawings. Furthermore, terms such as "first", "second", "one surface", and "the other surface" are used to distinguish one component from the other component, and the components are not limited by the terms. Moreover, detailed descriptions related to publicly-known technologies will be ruled out in order not to unnecessarily obscure subject matters of the present invention.

Hereafter, embodiments of the present invention will be described in detail with reference to the accompanying drawings.

Figure 2:
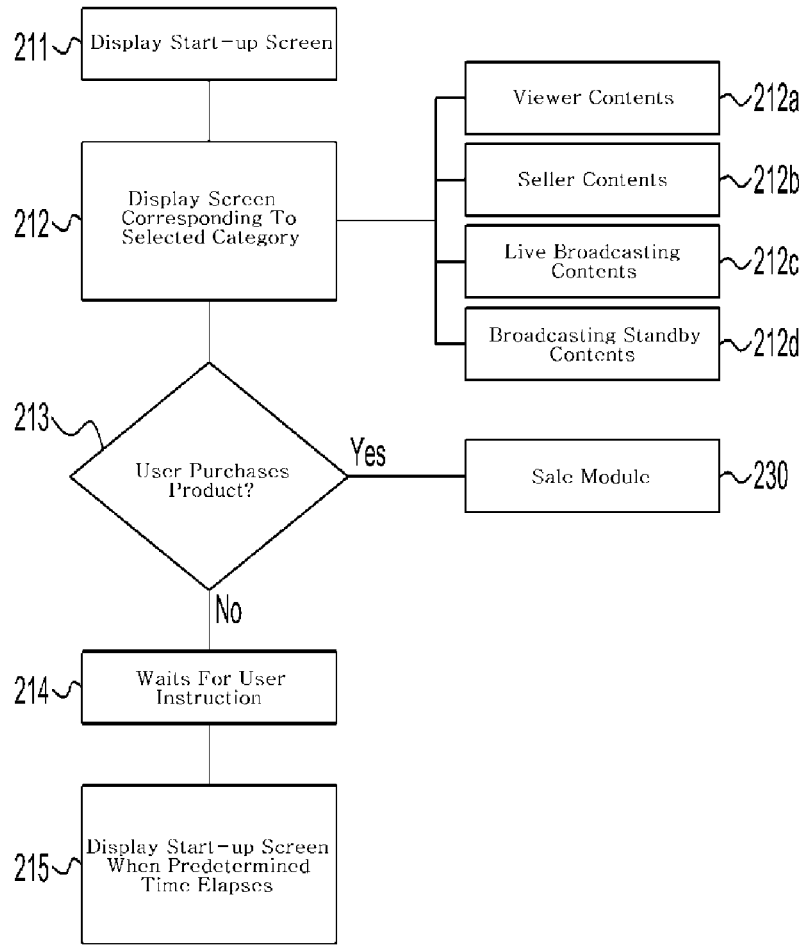
FIGS. 2 and 3 are flowcharts for explaining a user application according to an embodiment of the present invention.
Figure 3:
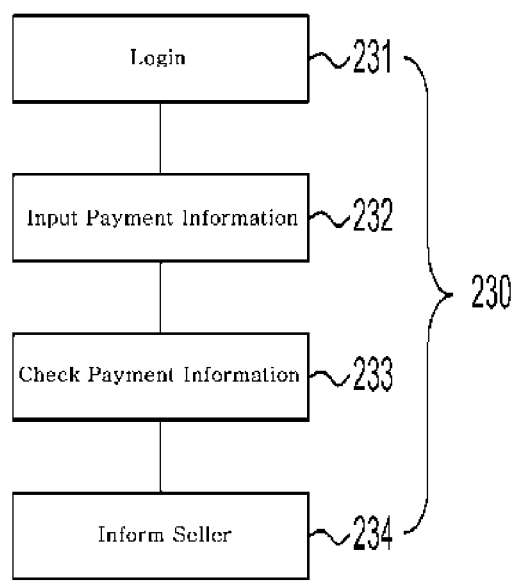
Figure 11:
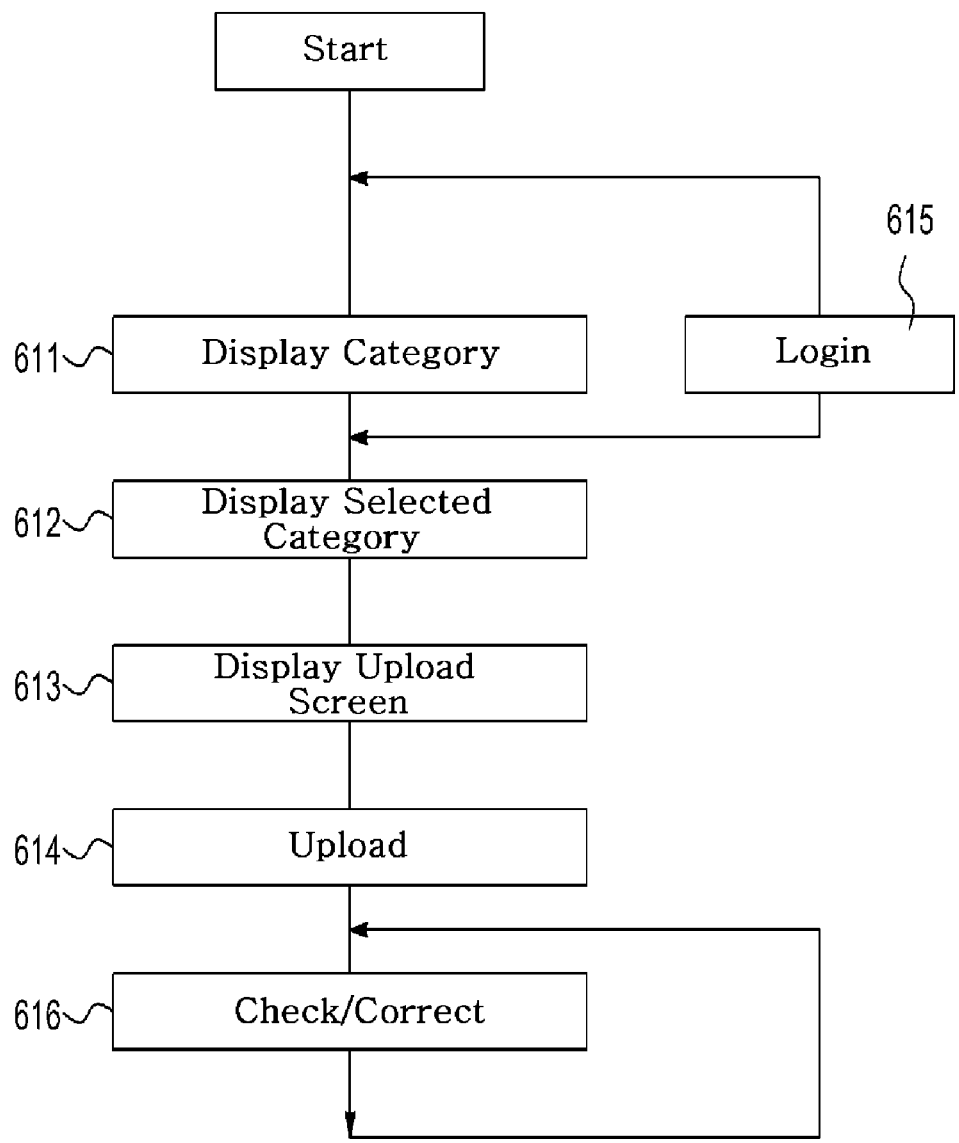
FIG. 11 is a flowchart for explaining a seller application according to an embodiment of the present invention.
Figure 12:
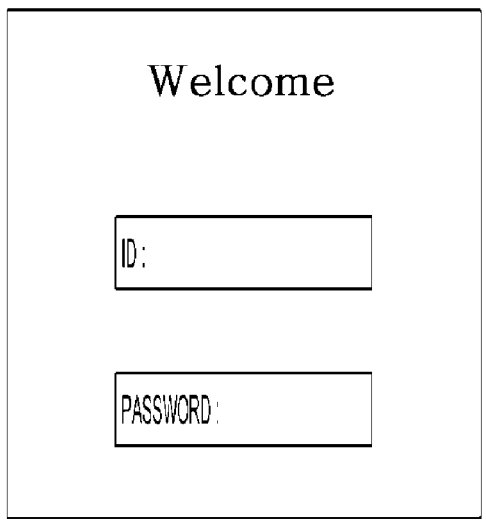
Figure 13:
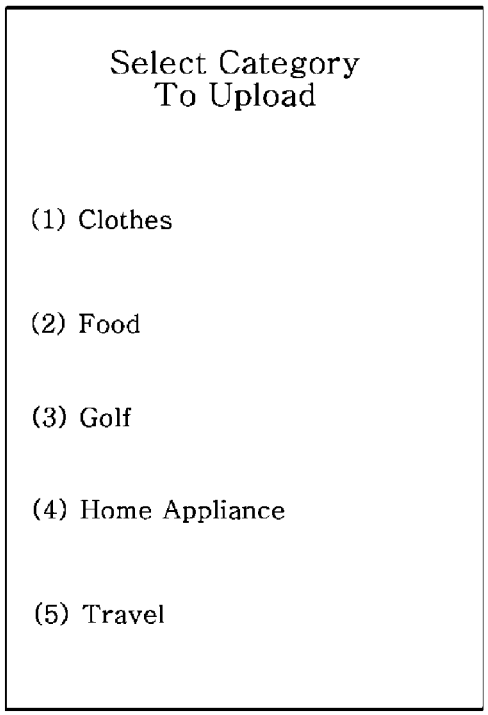

FIG. 1 is a conceptual view of a method for providing interactive contents for a smart TV according to an embodiment of the present invention. FIGS. 2 and 3 are flowcharts for explaining a user application according to an embodiment of the present invention. FIGS. 4 to 10 are conceptual views illustrating an example of the user application according to the embodiment of the present invention. FIG. 11 is a flowchart for explaining a seller application according to an embodiment of the present invention. FIGS. 12 to 14 are conceptual views illustrating an example of the seller application according to the embodiment of the present invention.

As illustrated in FIG. 1, the method for providing interactive contents for a smart TV according to the embodiment of the present invention includes a server 100, a smart TV 500, and a smart device 400 for a seller, and provides contents to a user through the smart TV 500. The server 100 stores viewer contents and seller contents provided by sellers. The smart TV 500 is used by the user, and has a user application 200 mounted therein so as to display contents. The smart device 400 for a seller has a seller application 600 mounted therein so as to upload contents to the server 100.

That is, the seller may directly transmit related contents to the server 100 through the smart device 400 such as a smart phone or computer, and the user may play the contents stored in the server 100 through the smart TV 500 and purchase a product related to the contents.

In the conventional method, a seller does not directly transmit contents to a related server, but delivers the contents to a specific person in charge. Then, the person in charge updates the contents to the server. Thus, it takes much time and effort to provide contents.

The present invention has been made in an effort to solve such a problem, and provide a method in which a seller directly transmits contents to a server and a user selects and plays contents. Thus, since time and effort required for providing contents can be reduced, vivid contents may be easily provided.

For this operation, the user application 200 may include an image reproduction module 210, a purchase module 230, and a communication module 240. The image reproduction module 210 reproduces contents stored in the server 100 on the smart TV 500, the purchase module 230 performs payment when a user purchases a product, and the communication module 240 communicates with the server 100.

That is, the image reproduction module 210 receives contents from the server 100, and reproduces the received contents on the smart TV 500. At this time, when a user watches the contents and decides to purchase a product, the user pays for the product through the purchase module 230.

The server 100 not only stores seller contents 110 supplied by a seller, but also stores high-quality contents which cannot be produced by ordinary people, for example, contents related to food recipe or sightseeing. Thus, the server 100 may provide the viewer contents 120 to be watched by the user.

Furthermore, the user may use a smart device such as a smart phone as well as the smart TV 500.

At this time, the communication between the smart TV 500 and the server may be performed through the communication module 240. Since the technology of the communication module 240 is publicly known, the detailed descriptions and illustrations thereof are omitted herein.

As illustrated in FIG. 2, the image reproduction module 210 may include displaying a start-up screen on the smart TV 500 watched by the user at step 211 (hereafter, referred to as user first step), displaying a screen corresponding to a category selected by the user at step 212 (hereafter, referred to as user second step), and driving the purchase module 230 for product payment when the user purchase a product, or displaying the start-up screen when no instruction is made after waiting for an instruction of the user for a predetermined time in case where the user does not purchase a product, at steps 213 and 214 (hereafter, referred to as user third and fourth steps).

That is, at the user first step 211, the image reproduction module 210 may display the start-up screen to show various categories as illustrated in FIG. 4. As illustrated in FIG. 4, the image reproduction module 210 may display a viewer category, a shopping category, a live broadcasting category, and a broadcasting standby category, and displays a category selected by the user at the user second step 212.

Figure 5:
Figure 5:
Figure 5:
Figure 5:
Figure 5:
Figure 5:

For example, when the user selects the viewer category 212a, the image reproduction module 210 may display movie/entertainment contents, TV contents, or community contents, and when the user selects the shopping contents 212b, the user may selects specific contents (refer to FIG. 5).

Figure 6:
Figure 6:
Figure 6:
Figure 6:
Figure 6:
Figure 6:

In particular, when the user selects the live broadcasting category 212c, the image reproduction module 210 may display categories on which contents provided by sellers can be displayed in real time as illustrated in FIG. 6. Then, the user may select a category to watch contents in real time.

Typically, contents provided by the seller are stored in the server 100, and then provided to the user. However, when the user selects the live broadcasting category 212c, contents may be transmitted to the user, even before the contents provided by the seller are completely stored in the server 100. Thus, the user can watch the contents in real time.

Furthermore, when the user selects the broadcasting standby category 212d, the image reproduction module 210 may display a screen on which the seller waits for broadcasting. At this time, however, when the seller uploads related contents, the contents may be displayed in real time.

Figure 7:
Figure 7:
Figure 7:
Figure 7:
Figure 7:
Figure 7:
Figure 8:
Figure 9:
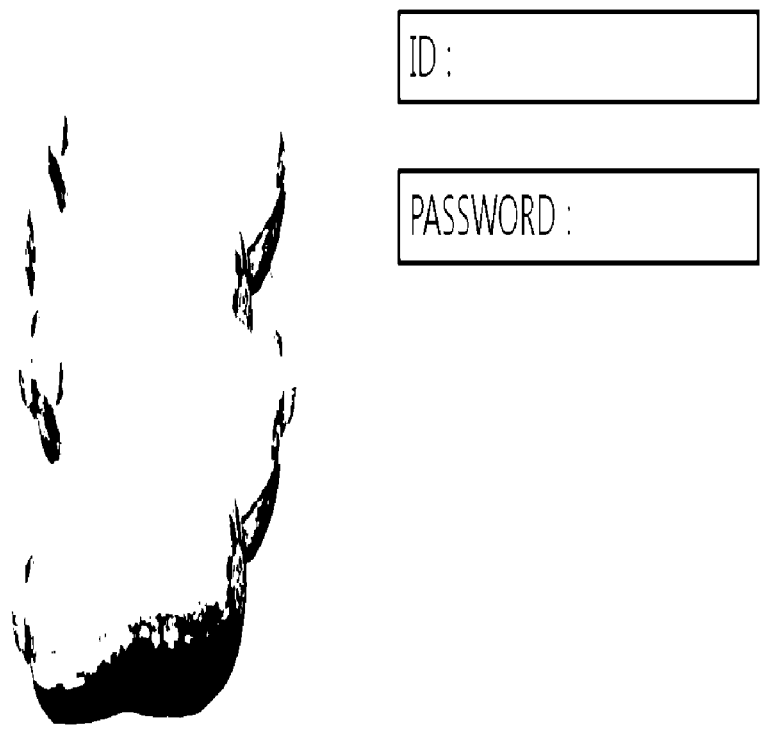
Figure 10:

That is, as illustrated in FIG. 7, the image reproduction module 210 may display the broadcasting standby category 212d, that is, the category before the seller uploads contents, and the user may select the category. In this case, when the seller updates the related contents, the contents may be displayed in real time.

The category selection may be performed through a remote control. Since such technology is widely known, the detailed descriptions and illustrations may be omitted.

When the user watches the contents at the user first and second steps 211 and 212 and wants to purchase the contents or a product related to the contents at the step 213, the purchase module may be driven at step 230 (hereafter, referred to as user third step).

That is, as illustrated in FIG. 5, when the user selects the final contents, the image reproduction module 210 may expand and display the related contents in the left side of the screen, and display information on price or others in the right side of the screen.

At this time, as illustrated in FIG. 3, the user third step 230 includes checking personal information inputted by the user at step 231, checking payment information inputted for product payment at step 232, approving the product sale when the input payment information is correct or rejecting the product sale when the input payment information is not correct, at step 233, and providing information to the seller when the product sale is approved, at step 234.

As illustrated in FIG. 6, the user application 200 may request the user to input the ID and password such that the personal information of the user can be checked. At this time, the user application 200 may display the photograph of the related product together.

When the input personal information is correct, the user application 200 may receive payment information, for example, a credit card number or a mobile phone number for mobile payment, and check whether the payment information is correct.

When the payment information is correct, the user application 200 may approve the product sale, and inform the seller of the product of the product sale such that the seller sends the product. On the other hand, when the payment information is not correct, the user application 200 may reject the product sale.

The payment information may be previously stored in the smart TV of the user. Then, when the personal information of the user is inputted, payment may be automatically performed.

As illustrated in FIG. 1, a seller application 600 may include an image transmission module 610 through which a seller updates contents to the server 100, an image editing module 620 for editing a related image, and a sale module 630 for transmitting and receiving sale-related information.

At this time, as illustrated in FIG. 11, the image transmission module 610 may include displaying a category of contents to be uploaded at step 611 (hereafter, referred to as seller first step), displaying a screen corresponding to a category selected by the seller at step 612 (hereafter, referred to as seller second step), displaying on the screen a button for selecting and uploading a contents file to be transmitted by the seller, a preview button, and a window for inputting product information at step 613 (hereafter, referred to as seller third step), and allowing the seller to upload contents at step 614 (hereafter, referred to as seller fourth step).

At this time, the image transmission module 610 may further include allowing the seller to log in, before or after the seller first step 611, at step 615 (hereafter, referred as seller fifth step).

That is, as illustrated in FIG. 13, the image transmission module 610 may display a category of contents to be uploaded, for example, a clothes or food category on the screen at the seller first step 611. When the seller selects a specific category at the seller second step 612, the image transmission module 610 may display the corresponding screen.

Then, at the seller third step 613, the image transmission module 610 may display a button for selecting and uploading a contents file to be transmitted by the seller, a preview button, and a window for inputting product information on the screen, as illustrated in FIG. 14.

At this time, the seller may click the upload button to upload the contents at the seller fourth step 614.

As illustrated in FIG. 11, the image transmission module 610 may further include allowing the seller to log in, before or after the seller first step 611, at step 615 (hereafter, referred to as seller fifth step).

That is, at the seller fifth step 615, the seller may input an ID and password to log in, as illustrated in FIG. 12.

Furthermore, as illustrated in FIG. 11, the image transmission module 610 may further include checking or correcting the contents at step 616 after performing the seller fourth step 614 at which the seller uploads contents.

That is, the seller may click the preview button illustrated in FIG. 14 so as to check the contents, correct the contents if necessary, and upload the corrected contents.

Through the image editing module 620, the seller extracts and edits only a desired image. Since such module is widely known, the detailed descriptions and illustrations thereof are omitted herein.

Furthermore, the smart device 400 of the seller may communicate with the server through the communication module 600. Since this technology is also widely known, the detailed descriptions and illustrations thereof are omitted herein.

According to the embodiment of the present invention, a seller may directly upload related contents, and a user may use the contents. Thus, since the contents can be easily updated, vivid contents may be provided.

At this time, the seller may provide contents to the server through a mobile phone or computer. Since this technique is widely known, the detailed descriptions and illustrations thereof are omitted herein.

While the present invention has been described with respect to the specific embodiments, it will be apparent to those skilled in the art that various changes and modifications may be made without departing from the spirit and scope of the invention as defined in the following claims.

What is claimed is:

1. A method for providing interactive contents via a smart television (TV), which comprises:

storing in a server, viewer contents for a user and seller contents provided by a seller;

displaying contents to be used by the user on a user application of the smart TV; and allowing the seller to directly upload contents to the server through a smart device which includes a seller application, wherein the user application is operated based on an image reproduction module configured to reproduce the viewer and seller contents stored in the server on the smart TV, based on a purchase module configured to make payment for purchased products, and based on a communication module configured to communicate with the server, wherein the seller application is operated based on an image transmission module for uploading the seller contents to the server, based on an image editing module for editing relevant images of the seller contents, and based on a sale module for transmitting and receiving sale-related information, wherein the image reproduction module is operated based on stages, at which a start-up screen comprising a viewer category, a shopping category, a live broadcasting category and a broadcasting standby category is displayed on the smart television watched by the user, at which a screen of a category selected by the user is displayed, and at which, if the user purchases a product, the purchase module is run in order to make payment, and, if the user does not purchase, the start-up screen is displayed after a predetermined time elapses, and wherein the start-up screen is provided by the seller and displays the seller contents related to products for sale by category, and where the screen of the category selected by the user is displayed, multiple seller contents of the selected category are displayed and, when the user selects a particular content among the seller contents, the selected content is expanded on the screen of the category while the product-related information is displayed on one side of the screen.

2. The method of claim 1, wherein when the user selects the live broadcasting category, contents provided by the seller are displayed in real time, and when the user selects the broadcasting standby category, a standby screen is displayed, and when the seller uploads relevant contents, the relevant contents are displayed in real time.

3. The method of claim 1, wherein the purchase module is operated based on stages, at which personal information entered by the user is verified, at which payment information entered by the user to pay for the product is verified, at which product sale is approved if the payment information is correct, and rejected if the payment information is incorrect, and at which, if the product sale has been approved, relevant information is provided to the seller.

4. The method of claim 1, wherein the seller application is operated, based on stages, at which the image transmission module displays the category of the seller contents that are intended to be uploaded, at which the seller displays relevant images on a selected category, at which a button that allows the seller to select and upload the seller contents for transmission and screens for preview and product data input are displayed, and at which the seller uploads the seller contents.

5. The method of claim 4, wherein a stage at which the seller logs in before or after categories of the seller contents intended to be uploaded are displayed.

6. The method of claim 4, wherein a stage at which the seller can check or modify the seller contents after the seller uploads the seller contents.

* * * * *